(12) United States Patent
Ballard (10) Patent No.: US 9,734,554 B2
(45) Date of Patent: Aug. 15, 2017

(54) COMPENSATION FOR VIEWING WITH COMMON VISION ABNORMALITIES

(71) Applicant: CHARTER COMMUNICATIONS OPERATING, LLC, St. Louis, MO (US)

(72) Inventor: Justin Earl Ballard, Pasadena, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 9 days.

(21) Appl. No.: 14/633,963

(22) Filed: Feb. 27, 2015

(65) Prior Publication Data

US 2016/0253778 A1 Sep. 1, 2016

(51) Int. Cl.
*G06T 3/40* (2006.01)
*H04L 12/58* (2006.01)

(52) U.S. Cl.
CPC .............. *G06T 3/40* (2013.01); *H04L 51/043* (2013.01); *H04L 51/18* (2013.01); *H04L 51/26* (2013.01)

(58) Field of Classification Search
CPC ............. G06T 3/40; G06F 17/50; G06F 3/048–3/04897; H04N 5/2254; H04N 19/176; A61B 3/032; A61B 3/0041–3/0058; A61F 4/00
See application file for complete search history.

(56) References Cited

U.S. PATENT DOCUMENTS

| 5,201,034 A * | 4/1993 | Matsuura | G06F 9/4446 715/204 |
| 2002/0021411 A1* | 2/2002 | Wilson | A61B 3/028 351/222 |
| 2012/0262477 A1* | 10/2012 | Buchheit | G09G 5/00 345/619 |
| 2013/0127821 A1* | 5/2013 | Lewis | G06T 11/00 345/418 |

* cited by examiner

*Primary Examiner* — Daniel Hajnik
(74) *Attorney, Agent, or Firm* — Meagher Emanuel Laks Goldberg & Liao, LLP (57) ABSTRACT

The specification and drawings present a new method, apparatus and software related product (e.g., a computer readable memory or a storage device) for compensation of viewing quality in display/imaging devices for users with common vision abnormalities. In case a user not wearing compensation lenses (such as prescription eye glasses or contact lenses) it can be possible to compensate for user's vision abnormalities by applying an identified pre-programmed/stored compensation algorithm, corresponding to one of a plurality of common settings for corrective eye glasses, to the original content/image (e.g., video, multimedia content, digital pictures and the like), for displaying the resulting content on the display/imaging device for viewing with an acceptable level of quality by the user without wearing the compensation lenses.

24 Claims, 5 Drawing Sheets

Figure 5

COMPENSATION FOR VIEWING WITH COMMON VISION ABNORMALITIES

FIELD OF THE INVENTION

The invention relates to electronic displays and, more particularly but not exclusively, to compensation of viewing quality in display/imaging devices for users with common vision abnormalities.

BACKGROUND

Many people require reading glasses, prescription eyewear, including contact lenses, or other type of corrective eyewear in order to be able to clearly view text or other images. This includes images and/or text displayed on a screen of a device, such as the screen of a computer monitor or handheld mobile device.

However, there are instances where a user of a device may not be wearing their corrective eyewear and, therefore, the user may perceive the images displayed on the device to be blurry without the correction to focal length provided by their corrective eyewear. Thus navigating through their daily life may be difficult without the aid of corrective lenses (e.g., glasses or contact lenses). This is especially evident when considering how much of modern daily life is spent viewing devices with digital displays, which compound eye strain due to their very nature.

Following are some examples of daily tasks or activities that glasses or contact lens wearers may find challenging: falling asleep while watching television, resulting in glasses that may have damaged or bended frames the next morning; falling asleep while watching television, wearing contact lenses that still need to be removed for the health of the eye; neglecting to bring reading glasses to work, resulting in an inability to read from and work on a computer; losing or tearing a contact lens, resulting in an inability to read from and work on a computer.

SUMMARY

Various deficiencies in the prior art are addressed by using a method, apparatus and software related product according to embodiments disclosed herein.

According to a first aspect of the invention, a method, comprising: receiving, by the electronic device, an input user signal to activate image compensation mode for pre-compensating visual abnormalities of a user; and identifying, in the electronic device, one out of a plurality of pre-programmed compensation algorithms corresponding to one of a plurality of common settings for corrective eye glasses, each of the plurality of pre-programmed compensation algorithms being mapped to a respectful common setting out of the plurality of common settings for corrective eye glasses, to provide a content generated using the identified one pre-programmed compensation algorithm applied to an original content for displaying on an imaging device, so that the displayed content being viewed by the user not wearing compensation lenses with an acceptable level of quality.

According further to the first aspect of the invention, the method may further comprise: providing the content, after applying the identified pre-programmed compensation algorithm to the original content, for displaying on the imaging device for viewing with the acceptable level of quality by the user not wearing the compensation lenses.

According further to the first aspect of the invention, the identifying may include the identifying may include being viewed by the user, not wearing the compensation lenses and being at a predefined distance or within a range of distances from the imaging device, pre-stored images provided by the electronic device, each image being produced using a corresponding pre-programmed compensation algorithm applied to a predefined reference content, and being arbitrarily selected by the user one image produced using the one out of a plurality of pre-programmed compensation algorithms as providing said acceptable level of quality.

Still further according to the first aspect of the invention, the input user signal may comprise a corrective eye glasses prescription of the user, and the one of the plurality of common settings for corrective eye glasses being identified by comparing the corrective eye glasses prescription with each of the plurality of common settings, and by selecting at least one of the plurality of common settings being closest or coinciding with the corrective eye glasses prescription of the user, so that the one out of the plurality of pre-programmed compensation algorithms can be identified using the mapping. Further, when said visual abnormalities in the left and right eyes are different, the method may further comprise: modifying said corrective eye glasses prescription of the user by averaging spherical aberration and astigmatism parameters for the left and right eyes, and using said modified corrective eye glasses prescription of the user for said comparing and matching. Still further, the compensation lenses can be user's compensation glasses or contact lenses designed using the corrective eye glasses prescription.

According further to the first aspect of the invention, the electronic device may be configured to store the plurality of pre-programmed compensation algorithms. Further, the electronic device may be configured to further store the plurality of common settings. Still further, the electronic device can be further configured to store a pre-recorded video comprising a plurality of segments, each segment being generated by applying a corresponding compensation algorithm out of the plurality of pre-programmed compensation algorithms to a reference segment, so that at least one segment having the acceptable level of quality is selected by the user while viewing the pre-recorded video without wearing compensation lenses, so that the selected at least one segment identifies the one pre-programmed compensation algorithm.

According still further to the first aspect of the invention, the identified one pre-programmed compensation algorithm may be applied to the original content in the electronic device to generate the content.

According yet further still to the first aspect of the invention, the method may further comprises: sending, by the electronic device, a command to a further electronic device to apply the identified pre-programmed compensation algorithm to the original content and to provide the generated content for displaying on the imaging device for viewing by the user without wearing the compensation lenses. Further, the further electronic device can be a head-end in a cable system or the imaging device.

Yet still further according to the first aspect of the invention, the applying the identified one pre-programmed compensation algorithm to the original content may comprise using an algebraic transform including an inverse of a Lensmaker's Equation applied to the original content, the Lensmaker's Equation having parameters being determined by the corresponding one of the plurality of common settings. Further, the parameters in the Lensmaker's Equation can include a distance from the user to the imaging device, the distance being provided by a distance sensor.

Still yet further according to the first aspect of the invention, the content may be a video content, a movie, a multi-media content, or a data-content.

Still further still according to the first aspect of the invention, the electronic device can be a mobile phone, a smart phone, a tablet, a set top box (STB).

According further still to the first aspect of the invention, the imaging device may be a phone, a TV set, or a digital display.

According yet further still to the first aspect of the invention, the electronic device can comprise the imaging device.

According to a second aspect of the invention, an apparatus comprising: a processor; a storage medium for tangibly storing thereon program logic for execution by the processor, the program logic comprising: logic receiving, by the electronic device, an input user signal to activate image compensation mode for pre-compensating visual abnormalities of a user; and logic for identifying, in the electronic device, one out of a plurality of pre-programmed compensation algorithms corresponding to one of a plurality of common settings for corrective eye glasses, each of the plurality of pre-programmed compensation algorithms being mapped to a respectful common setting out of the plurality of common settings for corrective eye glasses, to provide a content generated using the identified one pre-programmed compensation algorithm applied to an original content for displaying on an imaging device, so that the displayed content being viewed by the user not wearing compensation lenses with an acceptable level of quality.

According to a third aspect of the invention, a non-transitory computer readable storage medium tangibly storing computer program instructions capable of being executed by a computer processor, the computer program instructions defining code for: receiving, by the electronic device, an input user signal to activate image compensation mode for pre-compensating visual abnormalities of a user; and identifying, in the electronic device, one out of a plurality of pre-programmed compensation algorithms corresponding to one of a plurality of common settings for corrective eye glasses, each of the plurality of pre-programmed compensation algorithms being mapped to a respectful common setting out of the plurality of common settings for corrective eye glasses, to provide a content generated using the identified one pre-programmed compensation algorithm applied to an original content for displaying on an imaging device, so that the displayed content being viewed by the user not wearing compensation lenses with an acceptable level of quality.

According to a fourth aspect of the invention, a user interface device, comprising: a processor; a storage medium for tangibly storing thereon program logic for execution by the processor, the program logic comprising: logic for providing an input user signal to activate image compensation mode for pre-compensating visual abnormalities of a user; and logic for identifying, one out of a plurality of pre-programmed compensation algorithms corresponding to one of a plurality of common settings for corrective eye glasses, each of the plurality of pre-programmed compensation algorithms being mapped to a respectful common setting out of the plurality of common settings for corrective eye glasses, to provide a content generated using the identified one pre-programmed compensation algorithm applied to an original content for displaying on an imaging device, so that the displayed content being viewed by the user not wearing compensation lenses with an acceptable level of quality.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

By way of introduction, prevalent eye disorders can be, for example, myopia (near-sightedness), hyperopia (far-sightedness), astigmatism (blurred vision), presbyopia (vision loss symptoms/inability to focus on near objects due to advanced age), color blindness (inability to perceive differences between some colors) and the like. These eye conditions are able to be corrected for due to the fact that they are accommodation and refractive disorders of the eye, with the exception of color blindness which is classified as a visual disturbance or blindness and does not have a common "fix".

Specialized corrective lenses (for example eye glasses or contact lenses—in either a divergent or convergent shape depending on eye condition) may be prescribed to aid a person with certain accommodation and refractive eye disorders in driving, reading, watching television, seeing his or her alarm clock, and other activities. These corrective lenses work by bending incoming light to the eye thereby adjusting the focal point to where an individual's eyes focus an image once it reaches the retina (not before or after). It should be noted that suffering from one of these disorders does not preclude one from suffering from other eye diseases. A person may suffer from far-sightedness as well as astigmatism, or, for example due to advanced age, also near-sightedness. Of course, any corrective lenses need to be worn at times fully corrected vision is desired, regardless of time of day or circumstance.

A method, apparatus and software related product (e.g., a computer readable memory or a storage device) are presented for compensation of viewing quality in display/imaging devices for users with common vision abnormalities. In case a user not wearing compensation lenses (such as prescription eye glasses or contact lenses) it can be possible to compensate for user's vision abnormalities by applying an identified pre-programmed/stored compensation algorithm, corresponding to one of a plurality of common settings for corrective eye glasses, to the original content/image (e.g., video, multi-media content, digital pictures and the like), for displaying the resulting content on the display/imaging device for viewing with an acceptable level of quality by the user without wearing the compensation lenses.

As shown herein, in a first embodiment, the compensation may be provided without even knowing a corrective eye glasses prescription of the user based on empirical identification of the appropriate pre-programmed compensation algorithm. Moreover, in a second embodiment, the corrective eye glasses prescription of the user may be entered through a user interface and the pre-programmed compensation algorithm can be selected then based on matching the corrective eye glasses prescription to one of the plurality of common stored settings for corrective eye glasses.

Thus, according to one embodiment, an electronic device can receive an input user signal to activate image compensation mode for pre-compensating visual abnormalities of a user. The input user signal may optionally comprise the corrective eye glasses prescription as further discussed herein in reference to the second embodiment.

Then it can be possible to identify, using a predefined procedure, one out of a plurality of pre-programmed (stored) compensation algorithms corresponding to one of a plurality of common (stored) settings for corrective eye glasses, each of the plurality of pre-programmed compensation algorithms being mapped to a respectful common setting out of the plurality of common settings for corrective eye glasses. Then, based on this identification, it is further possible to provide a content generated using the identified one pre-programmed compensation algorithm applied to an original content for displaying on a display/imaging device, so that the displayed content can be viewed by the user not wearing compensation lenses with an acceptable level of quality. The plurality of common settings for corrective eye glasses and the plurality of pre-programmed compensation algorithms can be stored in the electronic device.

Figure 2A:
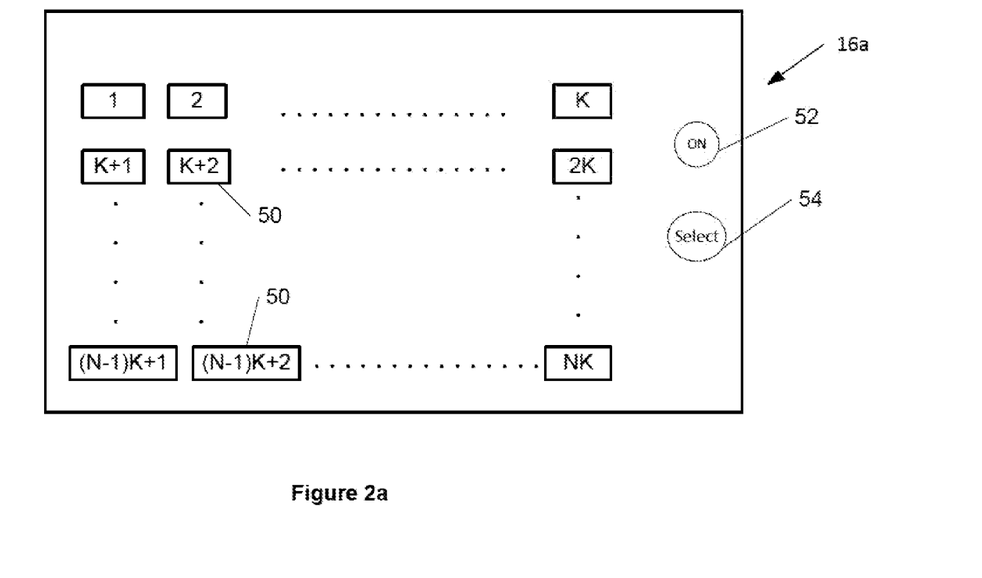
FIGS. 2a-2b are illustrative non-limiting examples for implementing a user interface/remote control device, according to various embodiments.
Figure 2B:
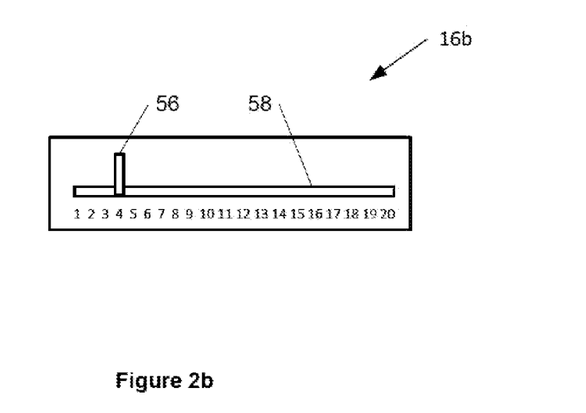

Moreover, according to another embodiment, the electronic device, such as a smart phone, computer, tablet, and the like may comprise the display imaging device. Alternatively, the electronic device may be a separate entity like a set top box (STB) for a cable TV or a remote control box (see an example in FIG. 2) for a regular TV or a display/imaging device.

In one variation, in the first embodiment (empirical approach), identifying the desired identified pre-programmed/stored compensation algorithm can include viewing by the user, not wearing the compensation lenses and being at a predefined distance or within a range of distances from the imaging device, pre-stored images provided by the electronic device, each image being produced using a corresponding pre-programmed compensation algorithm applied to a predefined reference content, such that the user can arbitrarily select the best image produced using the one out of the plurality of pre-programmed compensation algorithms as having the acceptable level of quality.

In another variation, in the first embodiment, the electronic device may be configured to store a pre-recorded video comprising a plurality of segments, each segment being generated by applying a corresponding compensation algorithm out of the plurality of pre-programmed compensation algorithms to the same reference segment (such as a short video clip), so that at least one segment having the acceptable level of quality can be selected by the user while viewing the pre-recorded video without wearing compensation lenses. Then the at least one selected segment can identify the one pre-programmed compensation algorithm.

In one variation, in the second embodiment, the input user signal can comprise a corrective eye glasses prescription of the user. In this scenario, the one of the plurality of common settings for corrective eye glasses can be identified by comparing this corrective eye glasses prescription with each of the plurality of common settings, and selecting at least one of the plurality of common settings being closest or coinciding with the corrective eye glasses prescription of the user, so that the one out of the plurality of pre-programmed compensation algorithms can be identified then using the mapping with the plurality of common settings for corrective eye glasses.

It is noted, that according to a conventional art (see Brian Buchheit, U.S. Pat. No. No. 8,605,082, Dec. 10, 2013), applying a compensation algorithm to the original content may be accomplished using an algebraic transform including an inverse of a Lensmaker's Equation applied to the original content to bend the light coming off of the screen in such a way as a glass lens would to correctly focus the image displayed on the back of the user's retina. Parameters for the Lensmaker's Equation can be determined by the corresponding one of the plurality of common settings for the corrective eye glasses. Moreover, the parameters in the Lensmaker's Equation can include a distance from the user to the display/imaging device, where this distance may be provided by a distance sensor (e.g., see example in FIG. 1).

According to various embodiments, the displayed content may be a video content, a movie, a multi-media content, a data-content and the like. Moreover, the imaging/display device may be a computer, a phone, a TV set, a digital display and the like. Furthermore, the electronic device can be a remote controller device, a mobile phone, a smart phone, a tablet, a set top box (STB) for cable TV, etc.

According to another embodiment, the electronic device may send a command to a further electronic device (such as a node or headend in cable TV network) to apply the identified pre-programmed compensation algorithm to the original content and to provide the generated content for displaying on the imaging/displaying device for viewing by the user (not wearing the compensation lenses) for correcting common vision abnormality.

It is further noted that most likely only one user specific eye can be accounted for by identifying, one pre-programmed compensation algorithm as described herein. For individuals who have differing magnitudes of visual abnormalities in each eye (the majority of individuals with eye disorders) the algebraic transform can account for one eye, but not the other at the same time. For most users this would not present a difficulty, however, for two reasons: visual differences between two eyes are generally minor and the human brain can compensate fairly easily for these minor differences.

In an alternative embodiment related to the second embodiment, when visual abnormalities in the left and right eyes are different, the corrective eye glasses prescription of the user can be modified by combining settings for left and right lenses based on a pre-defined rule (such as averaging parameters like spherical aberration (Sph) and astigmatism (Cyl) for left and right eyes, and then finding selecting at least one of the plurality of common settings being closest or coinciding with the combined (for left and right eyes) corrective glasses prescription of the user, so that the one out of the plurality of pre-programmed compensation algorithms may be identified using the corresponding mapping.

Figure 1:
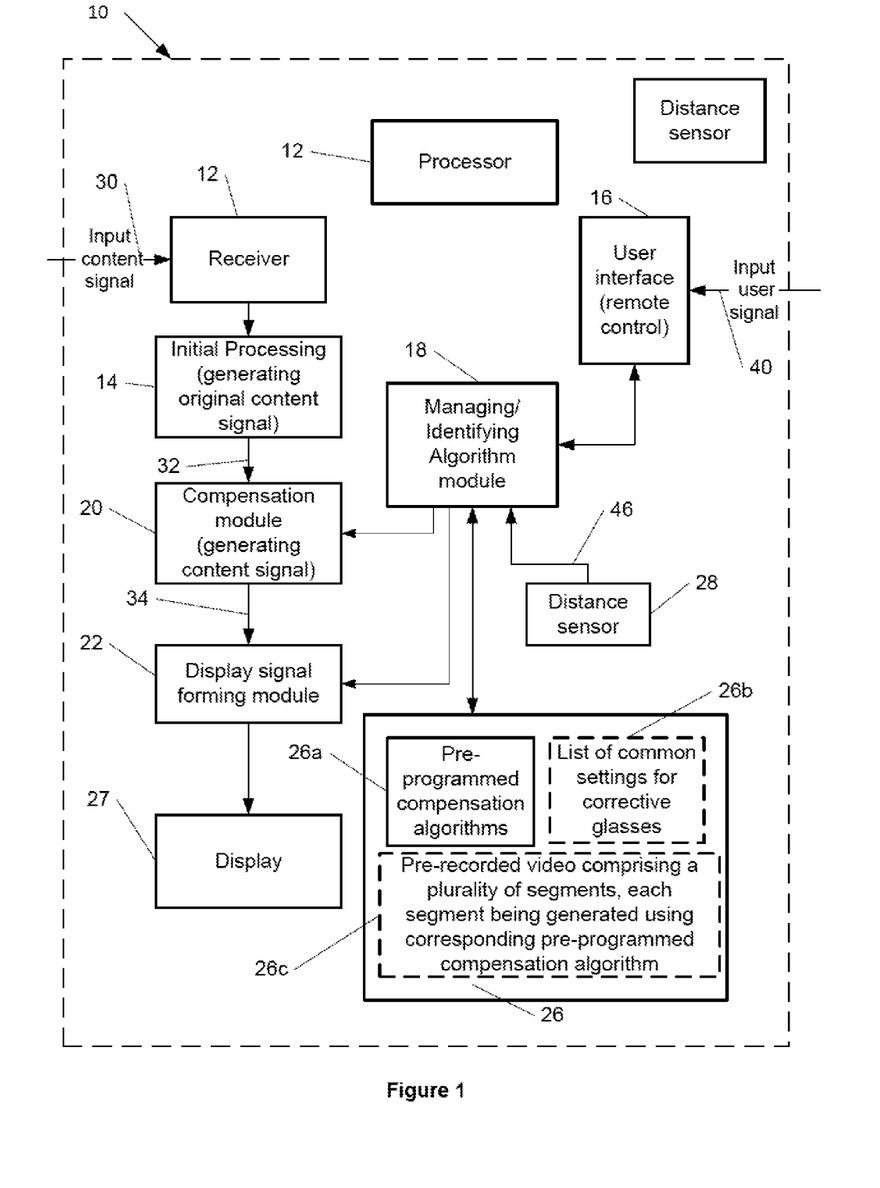
FIGS. 1 is an exemplary device/system block diagram for practicing various embodiments.

FIG. 1 shows an exemplary non-limiting block diagram of an electronic device/system 10 for practicing various embodiments described herein. Each module shown in FIG. 1 may be implemented as a separate block or may be combined with any other module/block of the device/system 10 or it may be split into several blocks according to their functionality.

Also each application module in FIG. 1 in general may be implemented as a software, a firmware and/or a hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Corresponding one or more processors 12 and one or more memories 26 are shown in FIG. 1, which can be part of one electronic device or several devices involved in implementations of various embodiments as described herein.

The device/system 10 comprises a managing/identifying algorithm (application) module 18, which is in communication with a user interface (remote control) module 16, one or more memories 26, a compensation module 20 generating a content signal, a display signal forming module 22 and optionally a distance sensor 28. The module 18 may be a software program executed by one of the processors 12.

The module 26 (one or more memories in a single device or multiple devices) may store various applications. For example, for implementing both first and second embodiments, the module 26 can store pre-programmed compensation algorithms in a memory segment 26a. Also for implementing the first embodiment, the module 26 may store a pre-recorded video comprising a plurality of segments, each segment being generated using a corresponding pre-programmed compensation algorithm, shown as memory segment 26c. Moreover, for implementing the second embodiment, the module 26 may store a list of common settings for corrective glasses in a memory segment 26b.

The user interface (remote control) module 16, described in more detail in reference to FIGS. 2a and 2b, receives/generates an input user signal 40 according to a first or second embodiment described herein (also see respective steps 60 and 70 in FIGS. 3 and 4) which is further received by the managing module 18. Then the managing module 18, in response to the input user signal 40, can implement the first or second embodiment depending on the content of the input user signal 40.

According to the first embodiment (if the input user signal does not include corrective eye glasses prescription), the module 18 can interactively engage compensation module 20 to identify one pre-programmed compensation algorithm using empirical approach when the user views on display 27 contents/video segments generated by applying different pre-programmed compensation algorithms stored in the memory segment 26a to a reference content (which may be triggered by the user as illustrated in FIG. 2a) thus providing the opportunity to the user (who does not wear corrective glasses) to choose empirically the one pre-programmed compensation algorithm providing an acceptable level of quality.

Optionally, this empirical approach can be made more automatic and simple by using the memory segment 26c storing the pre-recorded video comprising a plurality of segments, each segment being generated using corresponding pre-programmed compensation algorithm. In this case, the module 18 can engage a pre-recorded video stored in the memory segment 26c and provide it directly to a display signal forming module 22 to display the corresponding content on the display 27, as explained herein, thus providing the user (who does not wear corrective glasses) an opportunity to choose empirically a video segment generated using the one pre-programmed compensation algorithm providing an acceptable level of quality (see FIGS. 2a and 2b), and to identify this one pre-programmed compensation algorithm.

According to the second embodiment (if the input user signal 20 does include corrective eye glasses prescription), the module 18 can select one of the plurality of common settings for corrective eye glasses (e.g., stored in memory segment 26b) as being closest or coinciding with the corrective eye glasses prescription. Then the module 18 can identify one pre-programmed compensation algorithm by mapping to the selected one of the plurality of common settings for corrective eye glasses.

Thus, after the desired one pre-programmed compensation algorithm is identified in both the first and the second embodiments, the input content signal (such as a video signal) 30 is initially processed by a module 14 generating the original content signal 32 which is further processes by the compensation module 32 by applying to the original content signal 32 the identified one pre-programmed compensation algorithm thus generating the content signal 34, which is after being properly formed by the module 22 is provided to the display 27, so that so that the displayed content can be viewed by the user not wearing compensation lenses with the acceptable level of quality.

FIG. 1 further shows an optional distance sensor 28 for measuring distance from the user to the display/imaging device (in FIG. 1 represented at least by the display 27) and providing the measured distance signal 46 to the managing module 18. As mentioned herein, parameters in the Lensmaker's Equation can include a distance from the user to the display/imaging device. As known in the visual art, the eye lens, by changing its shape, can function to change the focal distance of the eye so that it can focus on objects at various distances. However, this functionality for eyes with abnormalities may be limited, especially at longer distances. Therefore, adding this parameter of distance will add a measure of magnification to compensate for the increasing distance between the user and the display. Thus, the managing module 18 may provide this distance parameter to the compensation module 20 to be included in the Lensmaker's Equation.

The device 10 shown in FIG. 1 may be just one electronic imaging device having a display, for example, such as a smart phone, a portable computer, a tablet and the like. However, the electronic device, such as a remote controller, STB box and the like, may comprise only modules 18, 16, processor and memory, whereas the display/imaging device may be a different device such as a separate digital LCD display, cable TV set, etc. The modules 18 and/or 20 may be implemented as phone applications, a chip in a cable box, a video card display driver, a video feed from headend or a node in a cable network.

FIGS. 2a and 2b demonstrate various non-limiting examples for implementing a user interface/remote control device 16 of FIG. 1 according to a first embodiment. FIG. 1a shows a device 16a having an ON button 16 (providing the input user signal) to activate image compensation mode for pre-compensating visual abnormalities of a user (see steps 60 and 70 in FIGS. 3 and 4 respectively). In this implementation the user has an opportunity to push any of the buttons 1, 2, . . . , NK 50 (or the like) to display a reference clip/segment generated using any of the pre-programmed compensation algorithms with the user being at a predefined distance from the display/screen and not wearing the compensation lenses. As soon as the user finds the clip satisfying the acceptable level of quality, the user can push (activate) Select button 54 thus selecting/identifying the one pre-programmed compensation algorithm (used to generate the selected clip/segment), which triggers applying the identified pre-programmed compensation algorithm to the original content, and displaying the resulting content on the display/imaging device for viewing by the user (not wearing the compensation lenses) with the acceptable level of quality.

A number of buttons 50 can be chosen to provide a sufficient number of common settings for corrective glasses applied to the reference clips/segments per user's request. The more alternatives for the common setting are offered, the more accurate matching to the required level of correction can be facilitated. The buttons 50 can be arranged, e.g., as a matrix with 10 columns (K=10) and 4 rows (N=4). Each member in a row may represent 10 different common setting (positive and negative) for a spherical aberration identified by a parameter Sph, typically from 0.25 to 6 (both positive and negative). Then each column member having the same parameter Sph may gave 4 different options for astigmatism (variation in parameters Cyl and Axis). FIG. 2b shows implementation of a similar concept as shown in FIG. 2a, but using a sliding bar 56 over a scale 58, where moving the sliding bar against a corresponding scale graduation numbers corresponds to pushing a corresponding button 50 in FIG. 2a. For simplicity, buttons 52 and 54 are omitted in FIG. 2a.

Figure 3:
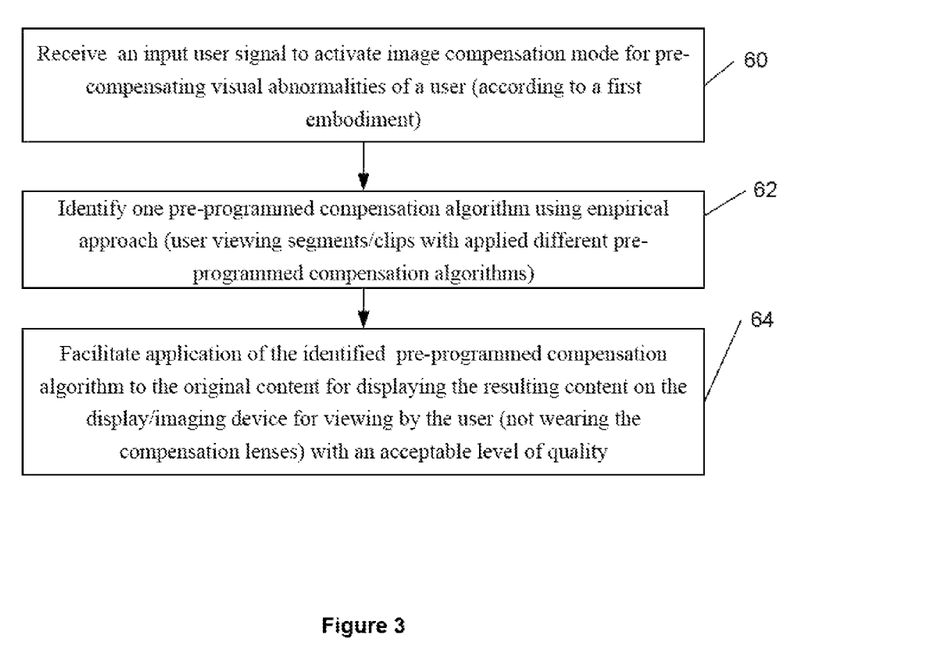
FIG. 3 is a flow chart demonstrating implementation according to a first embodiment.

With reference now to FIG. 3, shown is an exemplary flow chart demonstrating implementation of the described embodiments by an electronic device, as described herein. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

In a method according to the embodiment shown in FIG. 3, in a first step 60, an electronic device receives an input user signal to activate image compensation mode for pre-compensating visual abnormalities of a user (according to a first embodiment).

In a next step 62, the electronic device identifies one pre-programmed compensation algorithm (out of a plurality of pre-programmed compensation algorithms) using empirical approach such as the user viewing segments/clips with applied different pre-programmed compensation algorithms (see examples in FIGS. 1, 2a and 2b).

In a next step 64, the electronic device facilitates application of the identified pre-programmed compensation algorithm to the original content for displaying the resulting content on the display/imaging device for viewing by the user (not wearing the compensation lenses) with the acceptable level of quality.

Figure 4:
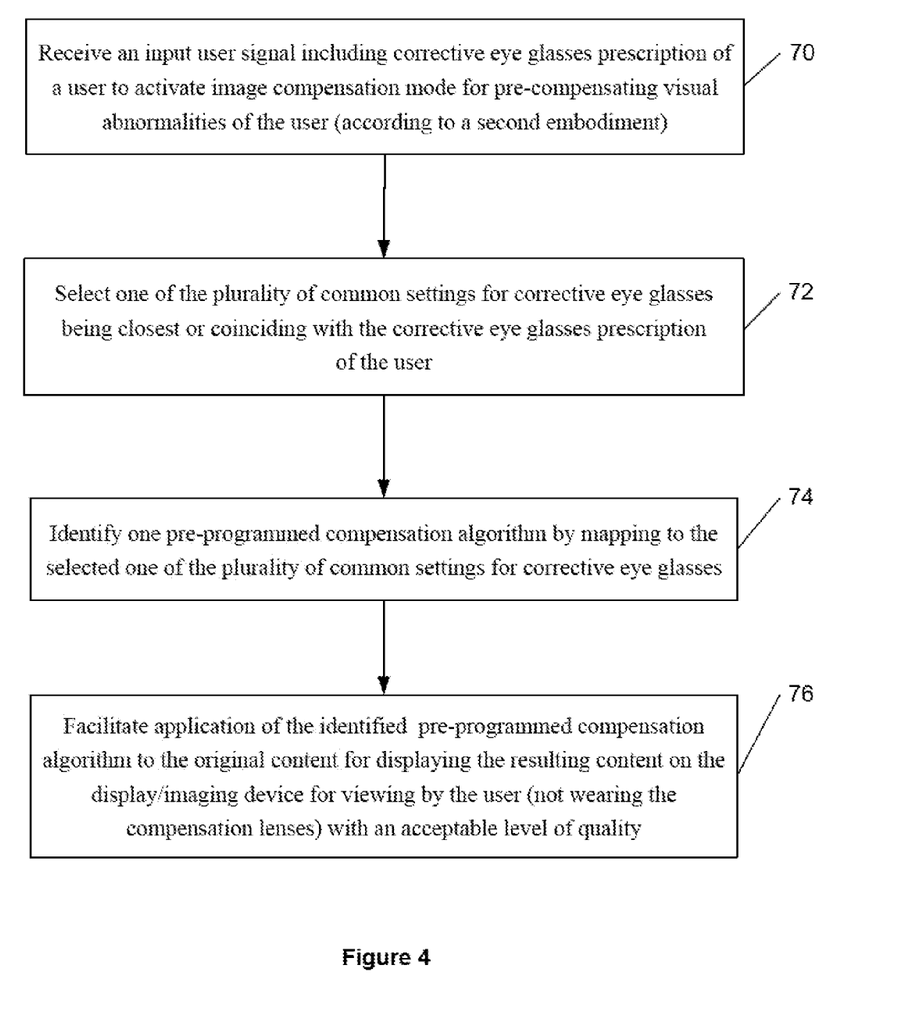
FIG. 4 is a flow chart demonstrating implementation according to a second embodiment.

With reference now to FIG. 4, shown is an exemplary flow chart demonstrating implementation of the described embodiments by an electronic device, as described herein. It is noted that the order of steps shown in FIG. 4 is not required, so in principle, the various steps may be performed out of the illustrated order. Also certain steps may be skipped, different steps may be added or substituted, or selected steps or groups of steps may be performed in a separate application following the embodiments described herein.

In a method according to the embodiment shown in FIG. 4, in a first step 70, an electronic device receives an input user signal including corrective eye glasses prescription of a user to activate image compensation mode for pre-compensating visual abnormalities of the user (according to a second embodiment).

In a next step 72, the electronic device selects one of the plurality of common settings for corrective eye glasses being closest or coinciding with the corrective eye glasses prescription of the user.

In a next step 74, the electronic device identifies one pre-programmed compensation algorithm by mapping to the selected one of the plurality of common settings for corrective eye glasses.

In a next final step 76, the electronic device facilitates application of the identified pre-programmed compensation algorithm to the original content for displaying the resulting content on the display/imaging device for viewing by the user (not wearing the compensation lenses) with the acceptable level of quality.

Figure 5:
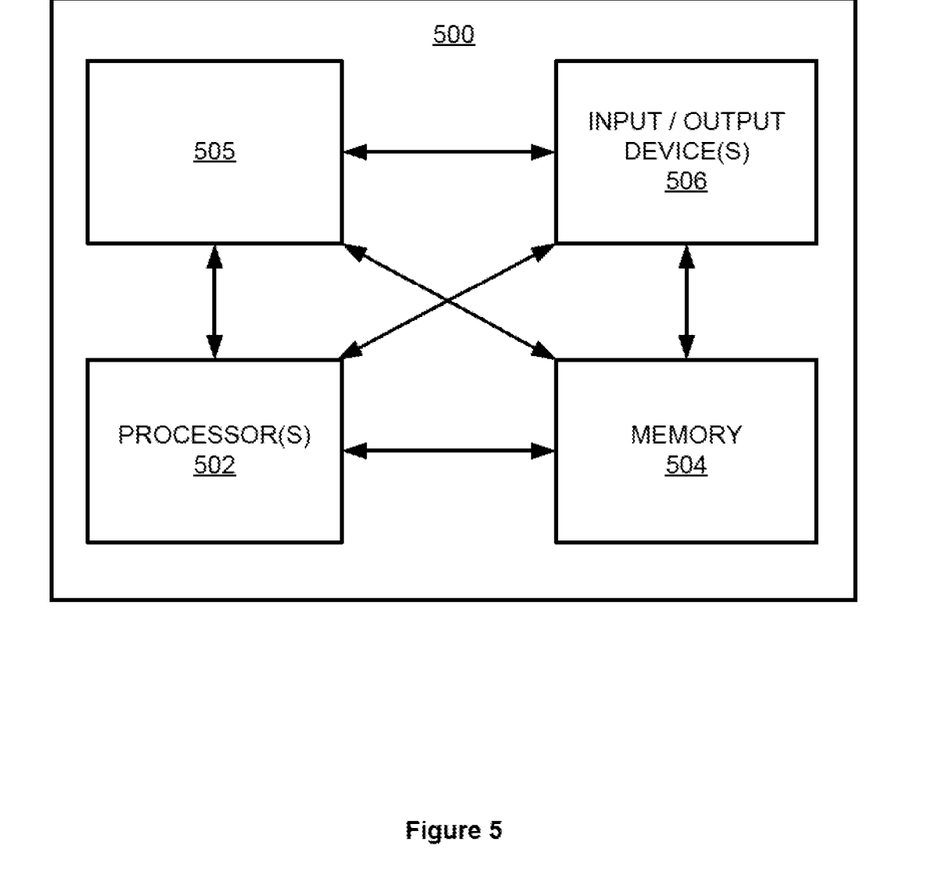
FIG. 5 is a high-level block diagram of an electronic device/computer suitable for performing various embodiments described herein.

FIG. 5 depicts a high-level block diagram of a computing device 500 suitable for use in performing various functions described herein with respect to the disclosed embodiments, such as those associated with device 12 as described above with respect to FIG. 1. FIG. 5 is a simplified block diagram of a computing/electronic device that is suitable for practicing the exemplary embodiments of this invention, and a specific manner in which components of the device are configured to cause that device to operate.

As depicted in FIG. 5, computer (computing device) 500 includes a processor element 503 (e.g., a central processing unit (CPU) and/or other suitable processor(s)), a memory 504 (e.g., random access memory (RAM), read only memory (ROM), and the like), a cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 505 can be loaded into memory 504 and executed by processor 502 to implement the functions as discussed herein. Thus, cooperating process 505 (including associated data structures) can be stored on a computer readable storage medium, e.g., RAM memory, magnetic or optical drive or diskette, and the like.

It will be appreciated that computing device 500 depicted in FIG. 5 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

The various embodiments contemplate an apparatus configured to provide functions in accordance with the various embodiments, the apparatus comprising a processor and a memory communicatively connected to the processor, the processor configured to perform these functions as described above with respect to the various figures.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method, comprising:
   receiving, by an electronic device, an input user signal to activate image compensation mode for pre-compensating visual abnormalities of a user; and
   identifying, in the electronic device, one out of a plurality of pre-programmed compensation algorithms corresponding to one of a plurality of common settings for corrective eye glasses, each of the plurality of pre-programmed compensation algorithms being mapped to a respectful common setting out of the plurality of common settings for corrective eye glasses, to provide a content generated using the identified one pre-programmed compensation algorithm applied to an original content for displaying on an imaging device, so that the displayed content being viewed by the user not wearing compensation lenses with an acceptable level of quality;
   comparing a corrective eve glasses prescription of the user with each of the plurality of common settings for selecting one of the plurality of common settings being closest to a corrective eve glasses prescription of the user, so that the one out of the plurality of pre-programmed compensation algorithms is identified thereby; and
   modifying said corrective eve glasses prescription of the user by averaging spherical aberration and astigmatism parameters for the left and right eyes, and using said modified corrective eve glasses prescription of the user for said comparing and selecting.

2. The method of claim 1, further comprising:
   providing, to the imaging device, the content generated using the identified one pre-programmed compensation algorithm.

3. The method of claim 1, wherein said identifying include being viewed by the user, not wearing the compensation lenses and being at a predefined distance or within a range of distances from the imaging device, pre-stored images provided by the electronic device, each image being produced using a corresponding pre-programmed compensation algorithm applied to a predefined reference content, and being arbitrarily selected by the user one image produced using the one out of a plurality of pre-programmed compensation algorithms as providing said acceptable level of quality.

4. The method of claim 1, wherein said electronic device is configured to store said plurality of pre-programmed compensation algorithms.

5. The method of claim 4, wherein said electronic device is configured to further store said plurality of common settings.

6. The method of claim 4, wherein said electronic device is further configured to store a pre-recorded video comprising a plurality of segments, each segment being generated by applying a corresponding compensation algorithm out of the plurality of pre-programmed compensation algorithms to a reference segment, so that at least one segment having said acceptable level of quality is selected by the user while viewing the pre-recorded video without wearing compensation lenses, so that the selected at least one segment identifies said one pre-programmed compensation algorithm.

7. The method of claim 1, wherein the identified one pre-programmed compensation algorithm is applied to original content in the electronic device to generate the content for displaying on the imaging device.

8. The method of claim 1, wherein the method further comprising:
   sending, by the electronic device, a command toward a further electronic device configured to cause the further electronic device to apply the identified pre-programmed compensation algorithm to original content thereat and to provide respective generated content for displaying on the imaging device for viewing by the user without wearing the compensation lenses.

9. The method of claim 8, wherein the further electronic device is a headend in a cable system.

10. The method of claim 1, wherein said applying the identified one pre-programmed compensation algorithm to the original content comprises using an algebraic transform including an inverse of a Lensmaker's Equation applied to the original content, said Lensmaker's Equation having parameters being determined by the corresponding one of the plurality of common settings.

11. The method of claim 10, wherein the parameters in said Lensmaker's Equation include a distance from the user to the imaging device, said distance being provided by a distance sensor.

12. The method of claim 1, wherein the content is a video content, a movie, a multi-media content, or a data-content.

13. The method of claim 1, wherein the electronic device is a mobile phone, a smart phone, a tablet, a set top box (STB).

14. The method of claim 1, wherein the imaging device is a phone, a TV set, or a digital display.

15. The method of claim 1, wherein said electronic device comprises said imaging device.

16. An apparatus comprising:
a processor;
a storage medium for tangibly storing thereon program logic for execution by the processor, the program logic comprising:
logic receiving, by an electronic device, an input user signal to activate image compensation mode for pre-compensating visual abnormalities of a user;
logic for identifying, by the electronic device, one out of a plurality of pre-programmed compensation algorithms corresponding to one of a plurality of common settings for corrective eye glasses, each of the plurality of pre-programmed compensation algorithms being mapped to a respectful common setting out of the plurality of common settings for corrective eye glasses, to provide a content generated using the identified one pre-programmed compensation algorithm applied to an original content for displaying on an imaging device, so that the displayed content being viewed by the user not wearing compensation lenses with an acceptable level of quality;
logic for comparing, by the electronic device, a corrective eve glasses prescription of the user with each of the plurality of common settings for selecting at least one of the plurality of common settings for selecting one of the plurality of common settings being closest to a corrective eve glasses prescription of the user, so that the one out of the plurality of pre-programmed compensation algorithms is identified thereby; and
logic for modifying, by the electronic device, said corrective eye glasses prescription of the user by averaging spherical aberration and astigmatism parameters for the left and right eyes, and using said modified corrective eye glasses prescription of the user for said comparing and selecting.

17. The apparatus of claim 16, wherein the identified one pre-programmed compensation algorithm is applied to the original content in the electronic device to generate the content.

18. The apparatus of claim 16, wherein the program logic further comprises:
logic for sending, by the electronic device, a command to a further electronic device to apply the identified pre-programmed compensation algorithm to the original content and to provide the generated content for displaying on the imaging device for viewing by the user without wearing the compensation lenses.

19. The apparatus of claim 18, wherein the further electronic device is a headend in a cable system.

20. A non-transitory computer readable storage medium tangibly storing computer program instructions capable of being executed by a computer processor, the computer program instructions defining code for:
receiving, by an electronic device, an input user signal to activate image compensation mode for pre-compensating visual abnormalities of a user;
identifying, by the electronic device, one out of a plurality of pre-programmed compensation algorithms corresponding to one of a plurality of common settings for corrective eye glasses, each of the plurality of pre-programmed compensation algorithms being mapped to a respectful common setting out of the plurality of common settings for corrective eye glasses, to provide a content generated using the identified one pre-programmed compensation algorithm applied to an original content for displaying on an imaging device, so that the displayed content being viewed by the user not wearing compensation lenses with an acceptable level of quality;
comparing, by the electronic device, a corrective eye glasses prescription of the user with each of the plurality of common settings for selecting at least one of the plurality of common settings for selecting one of the plurality of common settings being closest to a corrective eye glasses prescription of the user, so that the one out of the plurality of pre-programmed compensation algorithms is identified thereby; and
modifying, by the electronic device, said corrective eye glasses prescription of the user by averaging spherical aberration and astigmatism parameters for the left and right eyes, and using said modified corrective eye glasses prescription of the user for said comparing and selecting.

21. A user interface device, comprising:
a processor;
a storage medium for tangibly storing thereon program logic for execution by the processor, the program logic comprising:
logic for providing an input user signal to activate image compensation mode for pre-compensating visual abnormalities of a user; and
logic for identifying, one out of a plurality of pre-programmed compensation algorithms corresponding to one of a plurality of common settings for corrective eye glasses, each of the plurality of pre-programmed compensation algorithms being mapped to a respectful common setting out of the plurality of common settings for corrective eye glasses, to provide a content generated using the identified one pre-programmed compensation algorithm applied to an original content for displaying on an imaging device, so that the displayed content being viewed by the user not wearing compensation lenses with an acceptable level of quality;
logic for comparing a corrective eye glasses prescription of the user with each of the plurality of common settings for selecting one of the plurality of common settings being closest to a corrective eve glasses prescription of the user, so that the one out of the plurality of pre-programmed compensation algorithms is identified thereby; and
logic for modifying said corrective eye glasses prescription of the user by averaging spherical aberration and astigmatism parameters for the left and right eyes, and using said modified corrective eve glasses prescription of the user for said comparing and selecting.

22. The user interface device of claim 21, wherein the identified one pre-programmed compensation algorithm is applied to the original content in the electronic device to generate the content.

23. The user interface device of claim 21, wherein the program logic further comprises:
   logic for sending, by the electronic device, a command to a further electronic device to apply the identified pre-programmed compensation algorithm to the original content and to provide the generated content for displaying on the imaging device for viewing by the user without wearing the compensation lenses.

24. The user interface device of claim 21, wherein the further electronic device is a headend in a cable system.

* * * * *

UNITED STATES PATENT AND TRADEMARK OFFICE
CERTIFICATE OF CORRECTION

PATENT NO.         : 9,734,554 B2
APPLICATION NO.    : 14/633963
DATED              : August 15, 2017
INVENTOR(S)        : Justin Earl Ballard

Page 1 of 1

It is certified that error appears in the above-identified patent and that said Letters Patent is hereby corrected as shown below:

In the Claims

Column 11, Line 65, "respectful" should have been "respective" instead;
Column 12, Line 3, "being" should have been "is" instead;
Column 13, Line 30, "respectful" should have been "respective" instead;
Column 13, Line 35, "being" should have been "is" instead;
Column 14, Line 11, "respectful" should have been "respective" instead;
Column 14, Line 16, "being" should have been "is" instead;
Column 14, Line 47, "respectful" should have been "respective" instead; and
Column 14, Line 53, "being" should have been "is" instead.

Signed and Sealed this
Fifth Day of December, 2017

Joseph Matal
*Performing the Functions and Duties of the
Under Secretary of Commerce for Intellectual Property and
Director of the United States Patent and Trademark Office*